Patented July 29, 1941

2,250,558

UNITED STATES PATENT OFFICE 2,250,558

CONVERSION OF TERTIARY ACETYLENIC ALCOHOLS

Thomas H. Vaughn, Niagara Falls, N. Y., assignor to Union Carbide and Carbon Research Laboratories, Inc., a corporation of New York No Drawing. Application July 8, 1937,
Serial No. 152,530

2 Claims. (Cl. 260—678)

This invention relates to the dehydration of tertiary acetylenic alcohols; and more especially it concerns the production from these alcohols of alkyl vinyl acetylenes,—i. e. isoalkenyl acetylenes,—in better yields and with higher efficiencies than heretofore have been possible, and in relatively stable form.

Broadly considered, the invention comprises the liquid-phase catalytic dehydration of a tertiary acetylenic alcohol, or the removal therefrom of the elements of water, under conditions inhibiting or minimizing the decomposition or resinification of the resultant alkyl vinyl acetylenes and the formation of so-called "tar." The acetylenic alcohol is heated and refluxed in the presence of phosphoric acid, tetraphosphoric acid, or sulfuric acid, which acts as a dehydration catalyst. The acid may be used in concentrated form or in the form of a dilute aqueous or other solution, as hereinafter described.

The resultant alkyl vinyl acetylene is distilled from the reaction mixture; and preferably it is removed from the reaction zone substantially as rapidly as formed in order to assist in preventing its polymerization. The distilled reaction products may be suitably fractionated, the alkyl vinyl acetylene being separately recovered and any unreacted acetylenic alcohol being returned to the dehydration zone for another treatment. By thus minimizing the time during which the alkyl vinyl acetylene after its formation is in contact with the catalyst at the reaction temperature, the amount of the former that is converted into tarry polymers is greatly reduced.

The following examples will serve to illustrate the invention:

Example 1

To 42 grams (0.5 mol) of dimethylethynylcarbinol in a distillation flask connected with a receiver cooled to 0° C., 2.5 cc. of concentrated sulfuric acid was slowly added with constant agitation, during about 5 minutes. This corresponds to 5 cc. of the acid per mol of the carbinol. The reaction mixture, which became warm during this time, was then heated to boiling and was slowly distilled during a period of about 30 minutes. As the temperature of the vapors approached 85° C. the residue foamed and frothed, and distillation was stopped.

Upon fractionating the resultant distillate under atmospheric pressure, a yield of 14 grams of methyl vinyl acetylene was secured, together with 11 grams of unreacted dimethylethynylcarbinol suitable for reuse in the process. This corresponded to a 43% yield of the methyl vinyl acetylene based upon the dimethylethynylcarbinol, with an efficiency of 58%.

Small amounts of the ketone, methyl isopropenyl ketone, and the ketol, 2-methyl butanol-2-one-3, may be produced by a hydration occurring concurrently with the dehydration,—and these compounds may be isolated in the above-mentioned fractionation.

By reducing the ratio of concentrated sulfuric acid to dimethylethynylcarbinol to 4 cc. per 1.5 mols of the latter, and refluxing the mixture under a condenser, the temperature of which was so controlled that the methyl vinyl acetylene was removed from the reaction zone as rapidly as formed, a yield thereof of 50%, with an efficiency of 58% was obtained. Very favorable yields of the said methyl vinyl acetylene thus can be obtained by the use of concentrated sulfuric acid in amounts of from around 2.5 to 5 or more cc. for each mol of dimethylethynylcarbinol treated.

By using dilute sulfuric acid in place of concentrated acid, the amount of methyl vinyl acetylene decomposed to tarry products is very materially reduced; but the yields of the former are much lower. Thus by using, in a reaction conducted as described in Example 1, 100 cc. of a 10% aqueous solution of sulfuric acid per mol of dimethylethynylcarbinol, a quite low yield of methyl vinyl acetylene was secured, but no tar was produced.

Phosphoric acid, and particularly solutions thereof in water or other suitable diluent, are particularly efficacious as catalysts in the process. Excellent yields of methyl vinyl acetylene have been secured, for example, by treating dimethylethynylcarbinol with 20 cc. of concentrated phosphoric acid per mol of the said carbinol. Complete dehydration of the latter is effected; but a portion of the methyl vinyl acetylene produced is polymerized as soon as formed. By employing a 50% aqueous solution of phosphoric acid, even better yields and efficiencies are obtained. Amounts of aqueous phosphoric acid corresponding to from around 10 cc. to around 50 cc. of the concentrated acid per mol of dimethylethynylcarbinol give good yields of the methyl vinyl acetylene.

Example 2

One hundred cc. of a 50% aqueous solution of phosphoric acid was heated to boiling in a flask surmounted by a water-jacketed column maintained at 40° C., which was connected with a suitably cooled condenser and a collecting vessel. To this boiling liquid 84 grams (1 mol) of dimethylethynylcarbinol were slowly added in successive small portions during a period of 4.5 hours. During the additions, 56.5 grams of distillate were collected. This distillate was fractionally distilled under atmospheric pressure, and a fraction was secured boiling between 30° and 50° C. at atmospheric pressure containing an amount of methyl vinyl acetylene corresponding to a 60% yield based upon the carbinol treated. A fraction boiling between 50° and 104° C. contained 13 grams of unreacted dimethylethynylcarbinol, making the efficiency of the process 82%.

Tetraphosphoric acid also has been found to have valuable properties as a catalyst for the dehydration of tertiary acetylenic alcohols. This acid is a compound having the formula $H_6P_4O_{13}$ and is available on the market as a substantially water-white viscous liquid having a viscosity (Saybolt Universal) at 85° C. of 2000 seconds, and a specific gravity at 20° C. of 2.060. It has a phosphorous content corresponding to 82 to 84% of $P_2O_5$; and the acid does not crystallize at −50° C.

*Example 3*

A mixture of 100 grams of dimethylethynylcarbinol and 100 grams of an aqueous 80% solution of tetraphosphoric acid was refluxed for 5 hours under a condenser maintained at 45° C. During this time 41 grams of crude reaction product were distilled off, condensed and collected in a receiver cooled to 0° C. Fractional distillation of this product under atmospheric pressure yielded an amount of methyl vinyl acetylene equivalent to 53% of the theoretical yield. The yields of methyl vinyl acetylene are favorably influenced by the gradual addition of the acetylenic alcohol to the heated catalyst body, as described in Example 2, or by the slow addition of the acid to a body of the said alcohol, as recited in Example 1.

When an alkyl vinyl acetylene, such as methyl vinyl acetylene, which may be prepared by the dehydration of a tertiary acetylenic carbinol such as dimethylethynylcarbinol, in the presence of an acidic compound, such as those hereinbefore named, is allowed to said for a day or two, a white, insoluble, inflammable solid separates; and the amount thereof increases with the time of standing. It probably is a polymer of an alkyl vinyl acetylene. It has been found possible to eliminate from the alkyl vinyl acetylene the substance or substances responsible for the formation of these solid products by washing the former in the cold with a dilute solution of an alkaline compound such as an alkali metal hydroxide, carbonate or bicarbonate,—for example a 1% solution of sodium carbonate. Such basic compounds as ammonia, and organic bases such as the alkyl amines and alkylol amines may be used. Methyl vinyl acetylene thus treated has been found to remain unchanged even after standing for many months.

It will be understood that the present invention is not limited to the dehydration of dimethylethynylcarbinol, but also is applicable to the dehydration of the homologues and analogues thereof, such for example as 3-methylpentinol, 3-ethylhexinol, 3-methyloctinol, 3-methylisobutylcarbinol, and 3-propylhexinol.

This class of compounds may be designated as tertiary acetylenic alcohols, and may be represented by the formula:

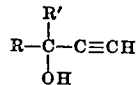

wherein R and R' respectively designate the same or different alkyl groups. The alkyl vinyl acetylenes produced therefrom may be represented by the formula:

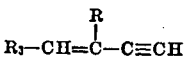

wherein R is any alkyl radical; and R₃ is either hydrogen or an alkyl radical.

*Example 4*

Thus, a mixture of 100 grams of methylethylethynylcarbinol and 100 grams of a 50% aqueous solution of phosphoric acid was refluxed during 6 hours under a condenser maintained at 84° C. Dehydration of the carbinol occurred, with the product being removed substantially as rapidly as formed and passed through the condenser and collected in a receiver cooled to 0° C. Upon fractionating the resultant distillate under atmospheric pressure, a 12% yield of the vinyl acetylene was obtained together with a considerable amount of unreacted carbinol. A fairly large amount of a ketone boiling between 130° and 135° C. and identified as 3 methylhexene-2-one-4 also was isolated from distillate. The vinyl acetylene has a boiling point of 66–67° C. at atmospheric pressure, and apparently has a structure corresponding to the designation 3-methyl-pentene-2-ine-4,

By the practice of the present invention it is possible to secure satisfactory yields of methyl vinyl acetylene, utilizing a dehydration process which involves the use of a relatively small amount of an inexpensive but very active catalyst. Less polymerization of the methyl vinyl acetylene, with resultant formation of tarry products, occurs in this process than in other known methods of liquid-phase dehydration of dimethylethynylcarbinol. This is particularly the case when using phosphoric acid.

The invention is susceptible of modification within the scope of the appended claims.

I claim:

1. Process for producing an alkyl vinyl acetylene resistant to polymerization, which comprises heating a monohydric tertiary acetylenic alcohol in the presence of a catalyst adapted to dehydrate the said acetylenic alcohol and form an alkyl vinyl acetylene, thereby removing the elements of water from said alcohol, separating the alkyl vinyl acetylene thus produced, washing the latter with a dilute solution of an alkaline compound, thereby stabilizing the alkyl vinyl acetylene, and separately recovering the thus stabilized alkyl vinyl acetylene.

2. Process for producing an alkyl vinyl acetylene resistant to polymerization, which comprises heating a monohydric tertiary acetylenic alcohol, having a composition designated by the formula

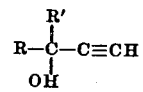

wherein R and R', respectively, designate the same or different alkyl groups, in the presence of an acidic catalyst adapted to dehydrate the said acetylenic alcohol and form an alkyl vinyl acetylene, thereby removing the elements of water from said alcohol, separating the alkyl vinyl acetylene thus produced, washing the latter with a dilute solution of an alkaline alkali metal compound, thereby stabilizing the alkyl vinyl acetylene, and separately recovering the thus-stabilized alkyl vinyl acetylene.

THOMAS H. VAUGHN.